United States Patent
Lee et al.

(10) Patent No.: US 11,480,489 B2
(45) Date of Patent: Oct. 25, 2022

(54) APPARATUS AND METHOD FOR CONTROLLING PRESSURE OF BRAKING SYSTEM

(71) Applicant: Hyundai Mobis Co., Ltd., Seoul (KR)

(72) Inventors: Dong Geun Lee, Yongin-si (KR); Ju Ho Lee, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 15 days.

(21) Appl. No.: 17/116,499

(22) Filed: Dec. 9, 2020

(65) Prior Publication Data
US 2021/0199531 A1    Jul. 1, 2021

(30) Foreign Application Priority Data
Dec. 26, 2019 (KR) .................. 10-2019-0175353

(51) Int. Cl.
*G01L 27/00* (2006.01)
*B60T 8/172* (2006.01)
*B60T 8/17* (2006.01)
*B60T 8/171* (2006.01)

(52) U.S. Cl.
CPC ............ *G01L 27/002* (2013.01); *B60T 8/171* (2013.01); *B60T 8/1701* (2013.01); *B60T 8/172* (2013.01)

(58) Field of Classification Search
CPC ........ B60T 8/171; B60T 8/172; B60T 8/1701; B60T 8/3675; B60T 2270/88; B60T 2250/06; B60T 13/68; B60T 13/662; B60T 13/665; G01L 19/0007; G01L 27/00; G01L 27/0002; G01L 2019/0053; G01R 33/02; G01P 1/122; G01P 3/42; G01P 3/56; G01P 13/045; G01P 15/00
USPC ..... 303/3; 324/160–162, 166, 207.2, 207.13, 324/207.24; 702/98
See application file for complete search history.

(56) References Cited

U.S. PATENT DOCUMENTS

| | | | | |
|---|---|---|---|---|
| 5,560,688 A * | 10/1996 | Schappler | ................. | B60T 8/36 303/3 |
| 5,782,541 A * | 7/1998 | Schappler | ............. | B60T 13/662 303/3 |
| 6,312,061 B1 * | 11/2001 | Schliebe | ................. | B60T 8/368 73/756 |
| 6,545,613 B1 * | 4/2003 | Hornback | ................. | B60T 8/00 340/870.14 |
| 2004/0178674 A1 * | 9/2004 | Lohberg | .................. | B60T 17/18 303/119.3 |

FOREIGN PATENT DOCUMENTS

KR    10-0569446    4/2006

* cited by examiner

*Primary Examiner* — Robert A. Siconolfi
*Assistant Examiner* — San M Aung
(74) *Attorney, Agent, or Firm* — H.C. Park & Associates, PLC (57) ABSTRACT

An apparatus for controlling pressure of a braking system including a pressure sensor configured to detect a pressure value within the braking system mounted in a vehicle, and collect the detected pressure value as an analog pressure signal; and a control device configured to calibrate the analog pressure signal received from the pressure sensor, convert the calibrated analog pressure signal into a digital pressure signal, and output the digital pressure signal.

14 Claims, 6 Drawing Sheets

APPARATUS AND METHOD FOR CONTROLLING PRESSURE OF BRAKING SYSTEM

CROSS-REFERENCE TO RELATED APPLICATION

This application claims priority from and the benefit of Korean Patent Application No. 10-2019-0175353, filed on Dec. 26, 2019, which is hereby incorporated by reference for all purposes as if set forth herein.

BACKGROUND

Field

Exemplary embodiments of the present disclosure relate to an apparatus and method for controlling pressure of a braking system, and more particularly, to an apparatus and method for controlling pressure of a braking system, which can control a low speed/low pressure zone of an autonomous vehicle with high precision.

Discussion of the Background

A vehicle includes a pressure sensor for monitoring a hydraulic pressure condition within a braking control device or an HU (Hydraulic Unit) system, in order to implement a braking function and an additional function for each condition. The HU system refers to a hydraulic source device which includes a pump, a driving motor, a tank and a relief valve or a hydraulic device including a control value of the hydraulic source device and configured as one body with the hydraulic source device. Such a pressure sensor converts analog signals, collected by a pressure element, into digital signals and outputs the digital signals. At this time, the pressure sensor converts the entire analog pressure signals into digital pressure signals having an equivalent level based on a resolution basis. Thus, the digital pressure signals have the same tolerance from a low pressure zone to a high pressure zone.

However, an autonomous vehicle having a speed limit has a low braking frequency in a high pressure zone in which sudden braking occurs, and thus requires a low pressure sensing ability for precision control in a low speed/low pressure zone rather than the accuracy of the high pressure zone.

The related art of the present disclosure is disclosed in Korean Patent No. 10-0569446 published on Apr. 7, 2006 and entitled "Optical Fiber Pressure Sensing System Using Optical Fiber".

The above information disclosed in this Background section is only for understanding of the background of the inventive concepts, and, therefore, it may contain information that does not constitute prior art.

SUMMARY

Exemplary embodiments of the present invention are directed to an apparatus and method for controlling pressure of a braking system, which can control a low speed/low pressure zone of an autonomous vehicle with high precision.

Additional features of the invention will be set forth in the description which follows, and in part will be apparent from the description, or may be learned by practice of the invention.

In an embodiment, an apparatus for controlling pressure of a braking system may include: a pressure sensor configured to detect a pressure value within the braking system mounted in a vehicle, and collect the detected pressure value as an analog pressure signal; and a control device configured to calibrate the analog pressure signal received from the pressure sensor, convert the calibrated analog pressure signal into a digital pressure signal, and output the digital pressure signal.

The control device may convert the analog pressure signal into a log scale pressure signal, convert the log scale pressure signal into a digital pressure signal, and output the digital pressure signal.

The control device may divide the analog pressure signal into zones having variable tolerance, in order to calibrate the analog pressure signal.

The control device may divide the analog pressure signal into a low pressure zone and a high pressure zone based on a preset reference value, and convert an analog pressure signal corresponding to the low pressure zone into a log scale pressure signal, wherein the control device sorts the low pressure zone into a zone greater than the high pressure zone, and performs precision control on the low pressure zone.

The control device may increase the number of measurement points in the low pressure zone further than the number of measurement points in the high pressure zone.

The control device may compare the analog pressure signal to a preset zone reference value, convert the analog pressure signal into a scaling and digital pressure signal according to the comparison result, and output the scaling and digital pressure signal.

The control device may include: a selector configured to compare the analog pressure signal to a preset low limit reference value or a preset upper limit reference value; a first converter configured to convert the analog pressure signal into a digital pressure signal, when the comparison result of the selector indicates that the analog pressure signal is equal to or less than the lower limit reference value or equal to or more than the upper limit reference value; and a second converter configured to convert the analog pressure signal into a digital pressure signal by amplifying the analog pressure signal by a preset multiple, attenuate the digital pressure signal by the preset multiple, and output the attenuated digital pressure signal, when the comparison result of the selector indicates that the analog pressure signal exceeds the lower limit reference value and is less than the upper limit reference value.

The control device may differently set zones of the analog pressure signal according to vehicle state information, in order to calibrate the analog pressure signal.

The control device may increase the number of measurement points in a zone requiring high precision, among the set zones, further than the other zones.

In an embodiment, a method for controlling pressure of a braking system may include: detecting, by a pressure sensor, a pressure value within the braking system mounted in a vehicle, and outputting an analog pressure signal based on the detected pressure value; converting, by a control device, the analog pressure signal into a log scale pressure signal; and converting, by the control device, the log scale pressure signal into a digital pressure signal, and outputting the digital pressure signal.

In the converting of the analog pressure signal into the log scale pressure signal, the control device may divide the analog pressure signal into zones having variable tolerance, and convert the analog pressure signal into a log scale pressure signal.

The converting of the analog pressure signal into the log scale pressure signal may include: dividing, by the control device, the analog pressure signal into a low pressure zone and a high pressure zone, based on a preset reference value; and converting the analog pressure signal corresponding to the low pressure zone into a log scale pressure signal, wherein the control device sorts the low pressure zone into a zone g than the high pressure zone, and performs precision control on the low pressure zone.

The low pressure zone may have a greater number of measurement points than the high pressure zone.

In an embodiment, a method for controlling pressure of a braking system may include: sensing, by a pressure sensor, a pressure value within the braking system mounted in a vehicle, and outputting an analog pressure signal based on the sensed pressure value; and comparing, by a control device, the analog pressure signal to a preset zone reference value, converting the analog pressure signal into a scaling and digital pressure signal according to the comparison result, and outputting the scaling and digital pressure signal.

The comparing of the analog pressure signal to the scaling and digital pressure signal may include: comparing, by the control device, the analog pressure signal to a preset low limit reference value or a preset upper limit reference value; and converting, by the control device, the analog pressure signal into a digital pressure signal and outputting the digital pressure signal, when the comparison result indicates that the analog pressure signal is equal to or less than the low limit reference value or equal to or more than the upper limit reference value.

The method may further include converting, by the control device, the analog pressure signal into a digital pressure signal by amplifying the analog pressure signal by a preset multiple, attenuating the digital pressure signal by the preset multiple, and outputting the attenuated digital pressure signal, when the comparison result indicates that the analog pressure signal exceeds the lower limit reference value and is less than the upper limit reference value.

In accordance with the embodiments of the present disclosure, the apparatus and method for control pressure of a braking system in accordance with the embodiment of the present disclosure may apply more pieces of bit information BIT to the low speed/low pressure zone of the autonomous vehicle, thereby improving the precision of the output value of the pressures sensor in the low pressure zone. That is, the apparatus and method may asymmetrically divide the low pressure zone and the high pressure zone, thereby improving the precision in the low pressure zone.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

The terms used in this application are only used to describe a specific embodiment, and not intended to limit the present disclosure. The terms of a singular form may include plural forms unless referred to the contrary. In this application, it should be understood that the meaning of "include" or "have" specifies a property, a number, a step, a process, an element, a component, or combinations thereof, but does not exclude in advance one or more other properties, numbers, steps, processes, elements, components, or combinations thereof. The terms such as first and second may be used to describe various elements, but the elements should not be limited by the terms. The terms are used only to distinguish one element from another element.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be . . . .

Hereinafter, an apparatus and method for controlling pressure of a braking system will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Furthermore, the embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor includes a communication device, such as a computer, a cell phone, a PDA (Personal Digital Assistant) and another device, which can facilitate information communication between end users.

Figure 1:
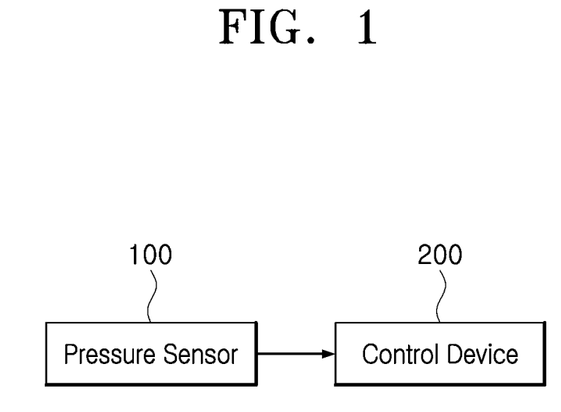
FIG. 1 is a block diagram illustrating an apparatus for controlling pressure of a braking system in accordance with an embodiment of the present disclosure.

FIG. 1 is a block diagram illustrating an apparatus for controlling pressure of a braking system in accordance with an embodiment of the present disclosure.

Referring to FIG. 1, the apparatus for controlling pressure of a braking system in accordance with the embodiment of the present disclosure includes a pressure sensor 100 and a control device 200.

The pressure sensor 100 detects a pressure value within a braking system mounted in a vehicle, collects the detected pressure value as an analog pressure signal, and transmits the analog pressure signal to the control device 200. The braking system may include a master cylinder, an HU (Hydraulic Unit) and the like, for example.

The control device 200 receives an analog pressure signal from the pressure sensor 100, calibrates the received analog pressure signal, converts the analog pressure signal into a digital pressure signal, and outputs the digital pressure signal. At this time, the control device 200 may sort the analog pressure signal into duty zones having variable tolerance, in order to calibrate the analog pressure signal. Therefore, the control device 200 may have variable tolerance (precision) for each duty zone, and the duty zone may indicate a low pressure zone, a high pressure zone and the like, which are divided according to preset standards. For example, the low pressure zone may indicate a zone having a pressure of 30 bar or less, and the high pressure zone may indicate a zone having a pressure of 150 bar or more.

The control device 200 in accordance with the embodiment of the present disclosure may have higher tolerance (lower precision) in the high pressure zone and lower tolerance (higher precision) in the low pressure zone, than a conventional control device. That is, the control device 200 may have low precision in the high pressure zone, and high precision in the low pressure zone. Thus, the control device 200 may control a high-speed/low-pressure zone of the autonomous vehicle with high precision.

The control device 200 may specialize the low-pressure zone when calibrating the characteristic of the pressure sensor 100, thereby improving the precision of the low-pressure zone. That is, when calibrating the pressure value of the pressure sensor 100, the control device 200 may divide an analog pressure signal into three zones including a low pressure zone, a middle pressure zone and a high pressure zone or two zones including a low pressure zone and a high pressure zone, increase the number of measurement points in the low pressure zone in comparison to that in the high pressure zone, and specialize the low pressure zone through an asymmetrical measurement operation in which the number of measurement points in the low pressure zone is higher than in the high pressure zone, thereby improving the precision of the low pressure zone. The asymmetry in precision between the low pressure zone and the high pressure zone may be referred to as variable precision.

The control device 200 may be used in an autonomous system or remote autonomous parking assistance system. In this case, the control device 200 may differently set the zones of the analog pressure signal according to vehicle state information, in order to calibrate the analog pressure signal. That is, when the vehicle state information including driving mode information or braking state information is received, the control device 200 may differently set necessary zones according to the vehicle state information, in order to control the precision. The driving mode information may include driver assistance modes related to autonomous driving, parking and braking (for example, SCC (Smart Cruise Control) and the like), and the braking state information may include stability control, emergency braking and the like. The control device 200 may increase the number of measurement points in a zone requiring high precision, among the set zones, further than the other zones.

Specifically, the control device 200 may provide higher precision in the low pressure zone than in the high pressure zone, in order to support precision control in the low speed/low pressure zone when using an autonomous driving function and a parking assistance function.

For example, when the pressure sensor 100 senses a low pressure of 1 bar or less under a low-pressure autonomous driving condition, the control device 200 may control the location of the vehicle with specific location precision, or specifically a precision of 30 mm or less, when controlling the location of the vehicle. Furthermore, when the vehicle is driven at a low speed of 5 Km/h or less, for example, through the remote autonomous parking assistance system and the pressure sensor 100 senses a low pressure of 1 bar or less, the control device 200 may control the location of the vehicle with specific location precision, or specifically a precision of 30 mm or less, when controlling the behavior and location of the vehicle.

Furthermore, the control device 200 may specialize the precision of a specific temperature range while the pressure value of the pressure sensor 100 is calibrated to implement high precision for the low pressure zone, thereby improving the precision.

Hereafter, a method in which the control device 200 improves the precision of the low speed/low pressure zone will be described.

The control device 200 converts an analog pressure signal, received from the pressure sensor 100, into a log scale analog signal, converts the log scale analog pressure signal into a digital pressure signal, and outputs the digital pressure signal. At this time, the control device 200 may convert the analog pressure signal corresponding to the low pressure zone into a log scale signal. That is, in order to implement high precision of the low pressure region, the control device 200 may convert the analog pressure signal measured in the low pressure zone into the log scale pressure signal, before converting the analog pressure signal into a digital pressure signal. Through this operation, more pieces of bit information BIT may be applied to the low pressure zone even though the same resolution is used, which makes it possible to improve the precision of an output value of the pressure sensor 100 in the low pressure zone, or specifically the precision of a zone having a pressure of 30 bar or less.

Furthermore, the control device 200 compares the analog pressure signal received from the pressure sensor 110 to a preset zone reference value, converts the analog pressure signal into a scaling and digital pressure signal according to the comparison result, and outputs the scaling and digital pressure signal. The zone reference value may include a lower limit reference value and an upper limit reference value, and indicate a randomly set value. Thus, when the analog pressure signal is equal or to less than the lower limit reference value or equal to or more than the upper limit reference value, the control device 200 converts the analog pressure signal into a digital pressure signal, and outputs the digital pressure signal. When the analog pressure signal exceeds the lower limit reference value and is less than the upper limit reference value, the control device 200 converts the analog pressure signal into a digital pressure signal by amplifying the analog pressure signal by a preset multiple, attenuates the digital pressure signal by the amplification multiple, and outputs the attenuated digital pressure signal. As the control device 200 amplifies the analog pressure signal and then converts the amplified signal into a digital pressure signal (ADC), the signal may be decomposed even though the same resolution is used. Then, the control device 200 may convert the digital pressure signal into the pressure signal at the original scale by attenuating the digital pressure signal by the amplification multiple, such that resolution intermediate information can be outputted, thereby improving the precision of the output value.

As described above, the control device 200 may asymmetrically apply a larger number of measurement points for the low pressure zone to an output signal than an actually input pressure value and the output signal zone under a condition in which the pressure sensor 100 having the same resolution is used, thereby improving the resolution of the pressure signal. That is, the low pressure zone and the high pressure zone may be asymmetrically divided to improve the precision in the low pressure zone.

The control device 200 may be implemented as a computer, and examples of the computer may include a navigation system and notebook, desktop and laptop computers having a web browser mounted therein. The control device 200 may include one or more computing devices, and the computing device may be a general-purpose CPU, a programmable device (CPLD or FPGA) implemented properly for a specific purpose, an ASIC (Application-Specific Integrated Circuit) or a microcontroller.

Figure 2:
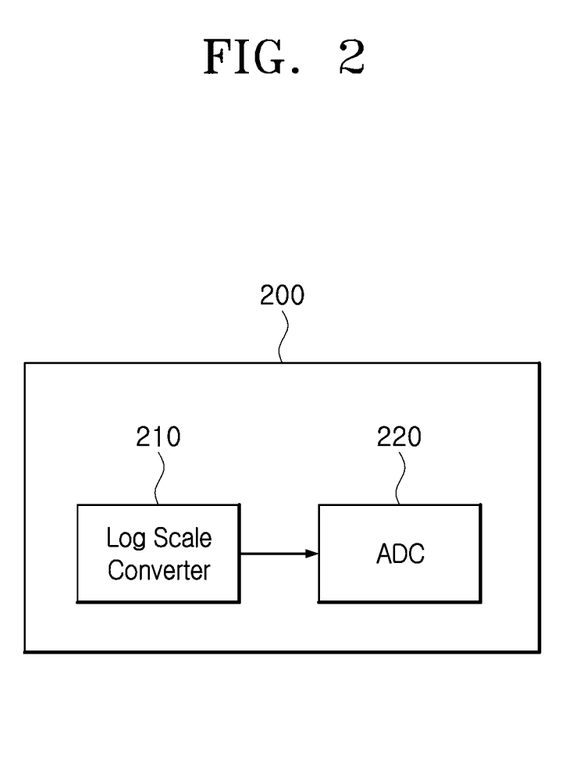
FIG. 2 is a block diagram illustrating a control device in accordance with the embodiment of the present disclosure.

FIG. 2 is a block diagram illustrating the control device in accordance with the embodiment of the present disclosure.

Referring to FIG. 2, the control device 200 in accordance with the embodiment of the present disclosure includes a log scale converter 210 and an ADC (Analog-to-Digital Converter) 220.

The log scale converter 210 converts an analog pressure signal received from the pressure sensor 100 into a log scale pressure signal. That is, the log scale converter 210 may convert the analog pressure signal using a log function. Then, the scale of the analog pressure signal may be increased or decreased.

The ADC 220 converts the analog pressure signal, converted into a log scale pressure signal by the log scale converter 210, into a digital pressure signal, and outputs the digital pressure signal.

Figure 6:
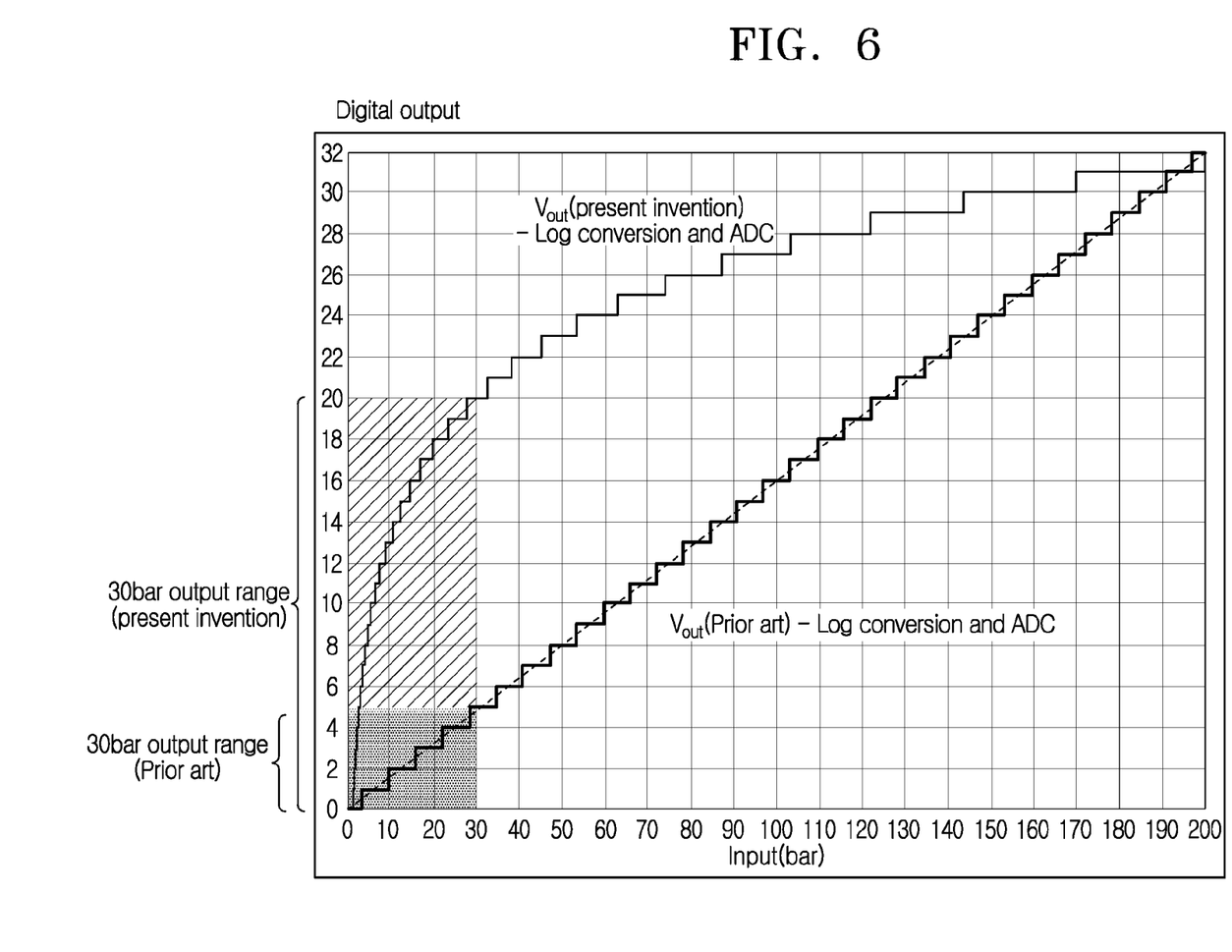
FIG. 6 is a graph illustrating a result obtained by converting an analog pressure signal of a low pressure zone into a log scale pressure signal and then outputting the log scale pressure signal as a digital pressure signal, in accordance with the embodiment of the present disclosure.

The control device 200 configured in the above-described manner may convert the analog pressure signal into a log scale pressure signal before converting the analog pressure signal into a digital pressure signal. Through this operation, more pieces of bit information BIT may be applied to the low pressure zone even though the same resolution is used, which makes it possible to improve the precision of an output value of the pressure sensor 100 in the low pressure zone, or specifically the precision of a zone having a pressure of 30 bar or less. That is, the control device 200 may implement high precision in the low pressure zone as illustrated in FIG. 6.

Figure 3:
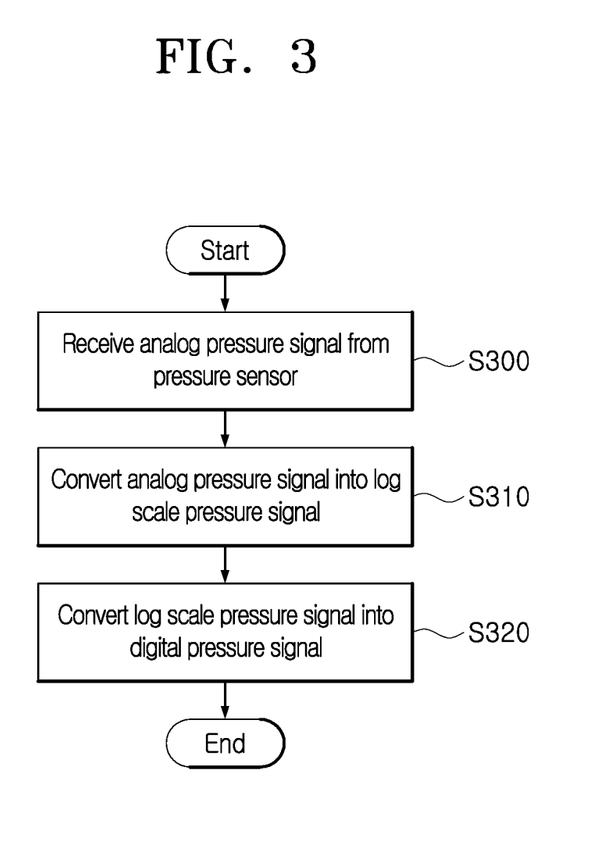
FIG. 3 is a flowchart for describing a pressure calibration control method in the braking system in accordance with the embodiment of the present disclosure.

FIG. 3 is a flowchart for describing a pressure calibration control method in the braking system in accordance with the embodiment of the present disclosure.

Referring to FIG. 3, when receiving an analog pressure signal from the pressure sensor 100 in step S300, the control device 200 converts the received analog pressure signal into a log scale pressure signal in step S310. At this time, the control device 200 may convert the analog pressure signal corresponding to the low pressure zone into a log scale pressure signal.

When step S310 is performed, the control device 200 converts the log-scale analog pressure signal into a digital pressure signal, and outputs the digital pressure signal, in step S320.

Figure 4:
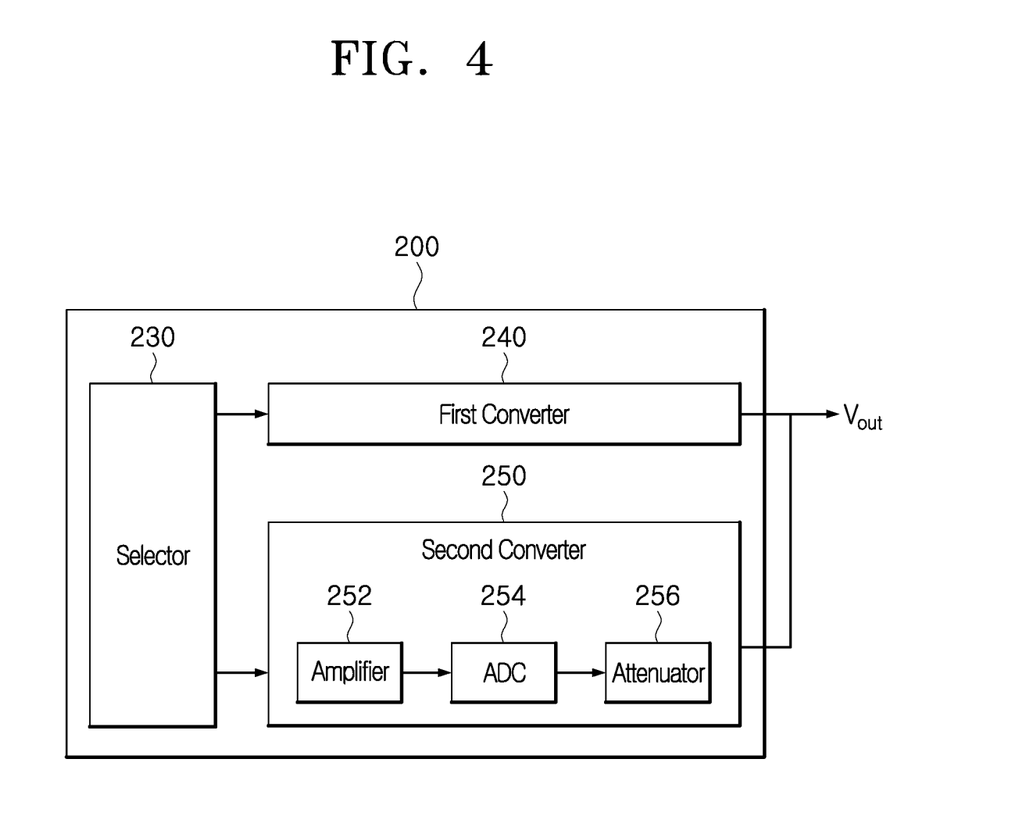
FIG. 4 is a block diagram illustrating a control device in accordance with another embodiment of the present disclosure.

FIG. 4 is a block diagram illustrating a control device in accordance with another embodiment of the present disclosure.

Referring to FIG. 4, the control device 200 in accordance with the another embodiment of the present disclosure includes a selector 230, a first converter 240 and a second converter 250.

The selector 230 compares an analog pressure signal received from the pressure sensor 100 to a preset lower limit reference value or upper limit reference value.

When the comparison result of the selector 230 indicates that the analog pressure signal is equal or to less than the lower limit reference value or equal to or more than the upper limit reference value, the first converter 240 converts the analog pressure signal into a digital pressure signal, and outputs the digital pressure signal.

When the comparison result of the selector 230 indicates that the analog pressure signal exceeds the lower limit reference value or is less than the upper limit reference value, the second converter 250 converts the analog pressure signal into a digital pressure signal by amplifying the analog pressure signal by a preset multiple, attenuates the digital pressure signal by the preset multiple, and outputs the attenuated digital pressure signal.

The second converter 250 includes an amplifier 252, an ADC 254 and an attenuator 256.

The amplifier 252 amplifies the analog pressure signal by the preset multiple, and transmits the amplified signal to the ADC 254. The preset multiple may indicate a preset value which is separately decided by the system and required precision. For example, the amplifier 252 may amplify the analog pressure signal M times.

The ADC 254 converts the analog pressure signal amplified by the amplifier 252 into a digital pressure signal.

The attenuator 256 attenuates the digital pressure signal, outputted by the ADC 254, by the amplification multiple of the amplifier 252, and outputs the attenuated digital pressure signal. For example, when the analog pressure signal is amplified M times by the amplifier 252, the attenuator 256 may attenuate the digital pressure signal M times.

Figure 5:
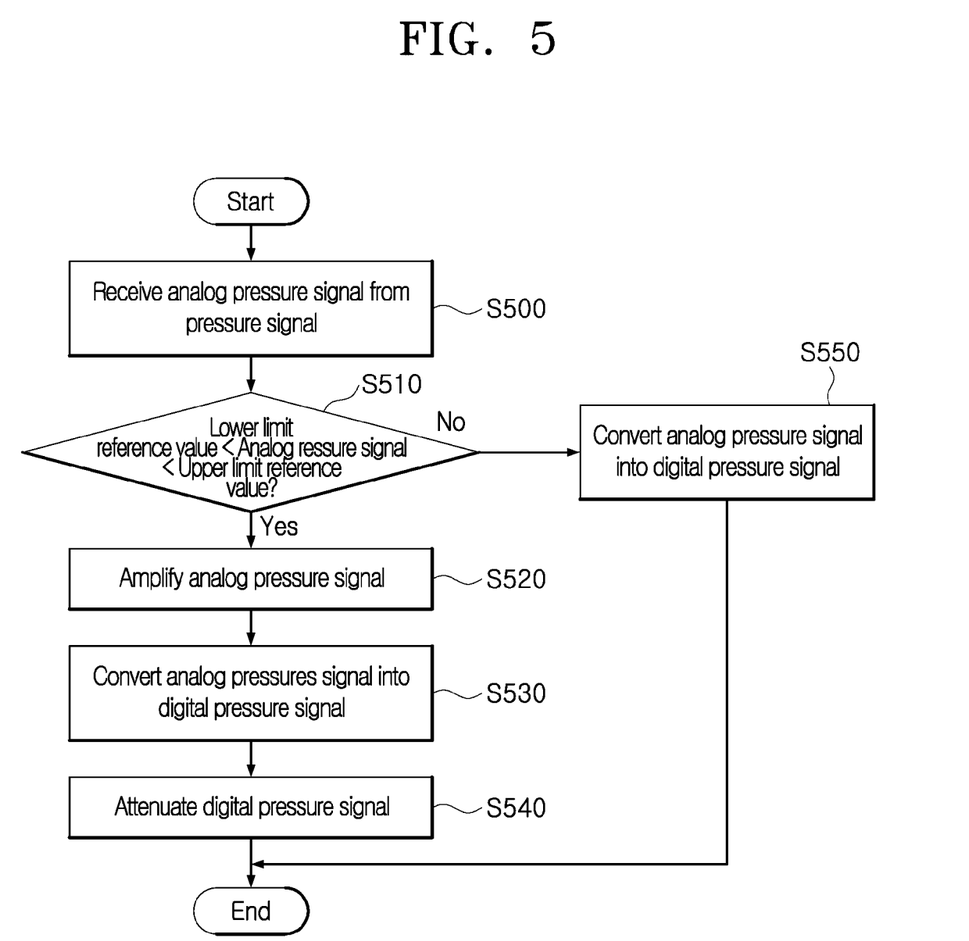
FIG. 5 is a flowchart for describing a pressure calibration control method in a braking system in accordance with another embodiment of the present disclosure.

FIG. 5 is a flowchart for describing a pressure calibration control method in a braking system in accordance with the embodiment of the present disclosure.

Referring to FIG. 5, when receiving an analog pressure signal from the pressure sensor 100 in step S500, the control device 200 determines whether the received analog pressure signal is equal to or less than a preset lower limit reference value and equal to or more than a preset upper limit reference value in step S510.

When the determination result of step S510 indicates that the analog pressure signal exceeds the lower limit reference value and is less than the upper limit reference value, the control device 200 amplifies the analog pressure signal by a preset multiple in step S520, and converts the amplified analog pressure signal into a digital pressure signal in step S530.

After step S530, the control device 200 attenuates the digital pressure signal by the amplification multiple, and outputs the attenuated digital pressure signal, in step S540.

When the determination result of step S510 indicates that the analog pressure signal is equal to or less than the lower limit reference value or equal to or more than the upper limit reference value, the control device 200 converts the analog pressure signal into a digital pressure signal, and outputs the digital pressure signal, in step S550.

As described above, the apparatus and method for control pressure of a braking system in accordance with the embodiment of the present disclosure may apply more pieces of bit information BIT to the low speed/low pressure zone of the autonomous vehicle, thereby improving the precision of the output value of the pressures sensor in the low pressure zone. That is, the apparatus and method may asymmetrically divide the low pressure zone and the high pressure zone, thereby improving the precision in the low pressure zone.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for controlling pressure of a braking system, comprising:
    a pressure sensor configured to detect a pressure value within the braking system mounted in a vehicle, and collect the detected pressure value as an analog pressure signal; and
    a control device configured to calibrate the analog pressure signal received from the pressure sensor, convert the calibrated analog pressure signal into a digital pressure signal, and output the digital pressure signal,
    wherein the control device increases the number of measurement points as the pressure value decreases.

2. The apparatus of claim 1, wherein the control device converts the analog pressure signal into a log scale pressure signal, converts the log scale pressure signal into a digital pressure signal, and outputs the digital pressure signal.

3. The apparatus of claim 1, wherein the control device divides the analog pressure signal into zones having variable tolerance, in order to calibrate the analog pressure signal.

4. The apparatus of claim 3, wherein:
    the control device divides the analog pressure signal into a low pressure zone and a high pressure zone based on a preset reference value, and converts an analog pressure signal corresponding to the low pressure zone into a log scale pressure signal; and
    the control device sorts the low pressure zone into a zone larger than the high pressure zone, and performs precision control on the low pressure zone.

5. The apparatus of claim 1, wherein the control device compares the analog pressure signal to a preset zone reference value, converts the analog pressure signal into a scaling and digital pressure signal according to the comparison result, and outputs the scaling and digital pressure signal.

6. The apparatus of claim 5, wherein the control device comprises:
    a selector configured to compare the analog pressure signal to a preset low limit reference value or a preset upper limit reference value;
    a first converter configured to convert the analog pressure signal into a digital pressure signal when the comparison result of the selector indicates that the analog pressure signal is equal to or less than the lower limit reference value or equal to or more than the upper limit reference value; and
    a second converter configured to convert the analog pressure signal into a digital pressure signal by amplifying the analog pressure signal by a preset multiple, attenuate the digital pressure signal by the preset multiple, and output the attenuated digital pressure signal when the comparison result of the selector indicates that the analog pressure signal exceeds the lower limit reference value and is less than the upper limit reference value.

7. The apparatus of claim 1, wherein, in order to calibrate the analog pressure signal, the control device differently sets zones of the analog pressure signal according to vehicle state information.

8. The apparatus of claim 7, wherein the control device increases the number of measurement points in a zone requiring high precision, among the set zones, to be greater than in the other zones.

9. A method for controlling pressure of a braking system, comprising:
    detecting, by a pressure sensor, a pressure value within the braking system mounted in a vehicle, and outputting an analog pressure signal based on the detected pressure value;
    converting, by a control device, the analog pressure signal into a log scale pressure signal; and
    converting, by the control device, the log scale pressure signal into a digital pressure signal, and outputting the digital pressure signal,
    wherein the control device increases the number of measurement points as the pressure value decreases.

10. The method of claim 9, wherein, in the converting of the analog pressure signal into the log scale pressure signal, the control device divides the analog pressure signal into zones having variable tolerance, and converts the analog pressure signal into a log scale pressure signal.

11. The method of claim 10, wherein:
    the converting of the analog pressure signal into the log scale pressure signal comprises:
        dividing, by the control device, the analog pressure signal into a low pressure zone and a high pressure zone, based on a preset reference value; and
        converting the analog pressure signal corresponding to the low pressure zone into a log scale pressure signal; and
    the control device sorts the low pressure zone into a zone larger than the high pressure zone, and performs precision control on the low pressure zone.

12. A method for controlling pressure of a braking system, comprising:
    sensing, by a pressure sensor, a pressure value within the braking system mounted in a vehicle, and outputting an analog pressure signal based on the sensed pressure value; and
    comparing, by a control device, the analog pressure signal to a preset zone reference value, converting the analog pressure signal into a scaling and digital pressure signal according to the comparison result, and outputting the scaling and digital pressure signal.

13. The method of claim 12, wherein the comparing of the analog pressure signal to the scaling and digital pressure signal comprises:
    comparing, by the control device, the analog pressure signal to a preset low limit reference value or a preset upper limit reference value; and converting, by the control device, the analog pressure signal into a digital pressure signal and outputting the digital pressure signal, when the comparison result indicates that the analog pressure signal is equal to or less than the low limit reference value or equal to or greater than the upper limit reference value.

14. The method of claim 13, further comprising converting, by the control device, the analog pressure signal into a digital pressure signal by amplifying the analog pressure signal by a preset multiple, attenuating the digital pressure signal by the preset multiple, and outputting the attenuated digital pressure signal, when the comparison result indicates that the analog pressure signal is greater than the lower limit reference value and is less than the upper limit reference value.

* * * * *